8317X
J. D. Woodside.
Water Gauge.
Patented Jul. 14, 1834.
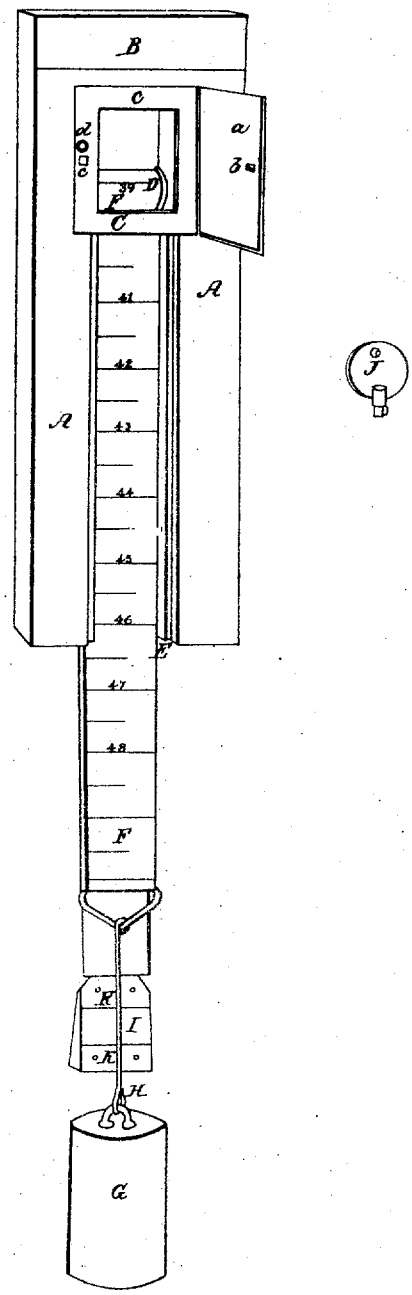

x !

July 14. 1834

James D. Woodside.

The schedule referred to, in these Letters Patent, and making part of the same, containing a description in the words of the said James D. Woodside, himself, of his Improvement in the Pump Guage.

---

To all to whom these presents shall come :- Be it known that I. James D. Woodside of the City of Washington in the District of Columbia, have invented a new and useful improvement in the Pump Gauge. This instrument is composed of a Small brass box or case of about two inches long, one and a half inch wide, and one inch deep, with a door and lock, containing a barrel or cylinder of half an inch diameter, let into the pump, just below the upper band, over which a tape passes from 4 to 6 feet of which is graduated in inches and half inches. This tape extends down a groove in the side of the pump, so far as it is graduated, the groove is covered with a strip of sheet iron. The tape then passes into a board casing of about two inches square in the clear, about four or six feet from a float which plays in this case, a brass wire connects the tape with the float. The length of that part of the tape which is not graduated, is governed by the depth of the hold, and the length of the wire - On the other end of the tape is a counter balancing weight intended for drawing up the slack as the float is raised by the water, consequently the graduated part of the tape passing over the cylinder in the case, shows the depth of water in the hold of the vessel. What I claim as my improvement is the vast difference between ascertaining the depth of water in the hold of a vessel, by the ordinary sounding rod, & this instrument. that the depth of water is more accurately ascertained, as the vibration occasioned by the rise and fall of the water, owing to the motion of the vessel, is at all times perceptible by the graduated tape, therefore the mean is the correct depth of water in the vessel.

Witness James D. Woodside

Robt. Clarke, Charles Bell

[377 words]

Exd.